US011849501B2

United States Patent
Wang et al.

(10) Patent No.: US 11,849,501 B2
(45) Date of Patent: Dec. 19, 2023

(54) METHOD FOR OBTAINING UE COUNTING RESULT, METHOD AND APPARATUS FOR SUSPENDING DATA TRANSMISSION

(71) Applicant: Samsung Electronics Co., Ltd., Suwon-si (KR)

(72) Inventors: Hong Wang, Beijing (CN); Lixiang Xu, Beijing (CN); Xiaowan Ke, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 17/232,030

(22) Filed: Apr. 15, 2021

(65) Prior Publication Data

US 2021/0235540 A1    Jul. 29, 2021

Related U.S. Application Data

(63) Continuation of application No. 15/301,368, filed as application No. PCT/KR2015/003126 on Mar. 30, 2015, now abandoned.

(30) Foreign Application Priority Data

Mar. 31, 2014   (CN) .......................... 20141012639.1

(51) Int. Cl.
*H04W 76/10*    (2018.01)
*H04W 76/40*    (2018.01)
(Continued)

(52) U.S. Cl.
CPC ............. *H04W 76/40* (2018.02); *H04W 4/08* (2013.01); *H04W 4/10* (2013.01); *H04W 76/10* (2018.02); *H04W 76/25* (2018.02); *H04W 76/27* (2018.02)

(58) Field of Classification Search
None
See application file for complete search history.

(56) References Cited

U.S. PATENT DOCUMENTS

2005/0190712 A1    9/2005    Lee et al.
2007/0206530 A1    9/2007    Lee et al.
(Continued)

FOREIGN PATENT DOCUMENTS

CN    1859109 A    11/2006
CN    101843120 A    9/2010
(Continued)

OTHER PUBLICATIONS

Partial European Search Report, dated Nov. 7, 2017, regarding Application No. 15774262.8, 16 pages.
(Continued)

*Primary Examiner* — Jenkey Van (57) ABSTRACT

The present disclosure provides a method for obtaining a UE counting result. The method includes: establishing, by the UE, a RRC connection; sending a UE counting response via the RRC connection; or, sending, by the UE, a RRC establishing message, and configuring a reason of establishing the RRC as MBMS UE counting. The present disclosure also provides a method for obtaining a UE counting result, a method and apparatus for suspending data transmission. By using the present disclosure, when the UE needs to receive the GCSE service, the MCE may obtain a correct counting result and not make wrong decision no matter whether the UE is in the RRC connected mode or in the idle mode. Therefore, the UE does not need to establish the point-to-point channel, and interruption of the data transmission and unnecessary power consumption are avoided.

6 Claims, 7 Drawing Sheets

(51) Int. Cl.
*H04W 76/27* (2018.01)
*H04W 76/25* (2018.01)
*H04W 4/08* (2009.01)
*H04W 4/10* (2009.01)

(56) References Cited

U.S. PATENT DOCUMENTS

| | | | |
|---|---|---|---|
| 2010/0110947 A1 | 5/2010 | Kitazoe | |
| 2010/0202341 A1 | 8/2010 | Vainikka et al. | |
| 2010/0329167 A1 | 12/2010 | Linden et al. | |
| 2011/0274025 A1 | 11/2011 | Hsu | |
| 2011/0305183 A1 | 12/2011 | Hsu et al. | |
| 2011/0319011 A1 | 12/2011 | Dong et al. | |
| 2012/0155364 A1 | 6/2012 | Kim et al. | |
| 2012/0202493 A1 | 8/2012 | Wang et al. | |
| 2012/0282932 A1 | 11/2012 | Yu et al. | |
| 2013/0107773 A1* | 5/2013 | Chang | H04W 76/40 370/311 |
| 2013/0107784 A1* | 5/2013 | Chang | H04W 72/30 370/312 |
| 2013/0229974 A1 | 9/2013 | Xu et al. | |
| 2013/0286926 A1 | 10/2013 | Zhang et al. | |
| 2014/0071878 A1 | 3/2014 | Xu et al. | |
| 2014/0192701 A1* | 7/2014 | Drevo | H04L 12/1868 370/312 |
| 2015/0230205 A1* | 8/2015 | Lin | H04W 4/06 370/312 |
| 2016/0249183 A1 | 8/2016 | Kim et al. | |
| 2016/0309522 A1* | 10/2016 | Li | H04W 72/23 |
| 2017/0013422 A1* | 1/2017 | Saiwai | H04W 4/06 |
| 2017/0251341 A1* | 8/2017 | Frost | H04L 12/189 |
| 2017/0302465 A1* | 10/2017 | Wang | H04W 76/36 |
| 2017/0318560 A1* | 11/2017 | Xu | H04W 4/06 |

FOREIGN PATENT DOCUMENTS

| | | |
|---|---|---|
| CN | 102281503 A | 12/2011 |
| EP | 1 748 658 B1 | 8/2018 |
| WO | 2012/139442 A | 10/2012 |

OTHER PUBLICATIONS

"3rd Generation Partnership Project; Technical Specification Group Services and System Aspects; Group Communication System Enablers for LTE (GCSE_LTE) (Release 12)", Technical Specification 3GPP TS 22.468 V12.0.0, Jun. 2013, 22 pages.

"3rd Generation Partnership Project; Technical Specification Group Radio Access Network; Evolved Universal Terrestrial Radio Access (E-UTRA); Radio Resource Control (RRC); Protocol specification (Release 12)", Technical Specification 3GPP TS 36.331 V12.1.0, Mar. 2014, 356 pages.

"3rd Generation Partnership Project; Technical Specification Group Services and System Aspects; Study on architecture enhancements to support Group Communication System Enablers for LTE (GCSE_LTE) (Release 12)", Technical Report 3GPP TR 23.768 V12.0.0, Feb. 2014, 63 pages.

Huawei, HiSilicon, "Service continuity for group communication over eMBMS", 3GPP TSG-RAN WG2 #85, Feb. 10-14, 2014, 7 pages, R2-140261.

Supplementary European Search Report dated Mar. 14, 2018 in connection with European Patent Application No. 15 77 4262.

China National Intellectual Property Administration, "The First Office Action," Application No. CN201410126391.1, dated Nov. 2, 2018, 19 pages.

ITRI, "Enhancement of eMBMS for Group communication," R2-134029, 3GPP TSG RAN WG2 #84, San Francisco, USA, Nov. 11-15, 2013, 4 pages.

International Search Report dated Jul. 15, 2015 in connection with International Patent Application No. PCT/KR2015/003126, 3 pages.

Written Opinion of the International Searching Authority dated Jul. 15, 2015 in connection with International Patent Application No. PCT/KR2015/003126, 6 pages.

General Dynamics UK Limited, "Minor Corrections and Clarifications", S2-141088, 3GPP TSG SA WG2 Meeting #102, St. Julian's, Malta, Mar. 18, 2014, 9 pages.

General Dynamics UK Limited, "Minor Corrections and Clarifications", S2-141354, 3GPP TSG SA WG2 Meeting #102, St. Julian's, Malta, Mar. 25, 2014, 4 pages.

Ericsson, "Update Section 4.2.1 for GCSE", S2-141365, 3GPP TSG SA WG2 Meeting #102, St. Julian's, Malta, Mar. 28, 2014, 2 pages.

Communication pursuant to Article 94(3) EPC dated Jun. 29, 2022 in connection with European Patent Application No. 21 153 544.8, 4 pages.

* cited by examiner

METHOD FOR OBTAINING UE COUNTING RESULT, METHOD AND APPARATUS FOR SUSPENDING DATA TRANSMISSION

CROSS-REFERENCE TO RELATED APPLICATIONS

This application is a continuation of U.S. patent application Ser. No. 15/301,368 filed on Sep. 30, 2016, which is a 371 of International Application No. PCT/KR2015/003126 filed on Mar. 30, 2015, which claims priority to Chinese Patent Application No. 201410126391 filed on Mar. 31, 2014, the disclosures of which are herein incorporated by reference in their entirety.

BACKGROUND

1. Field

The present disclosure relates to radio communication technologies, more particularly to, a method for obtaining a UE counting result, a method and apparatus for suspending data transmission.

2. Description of Related Art

Figure 1:
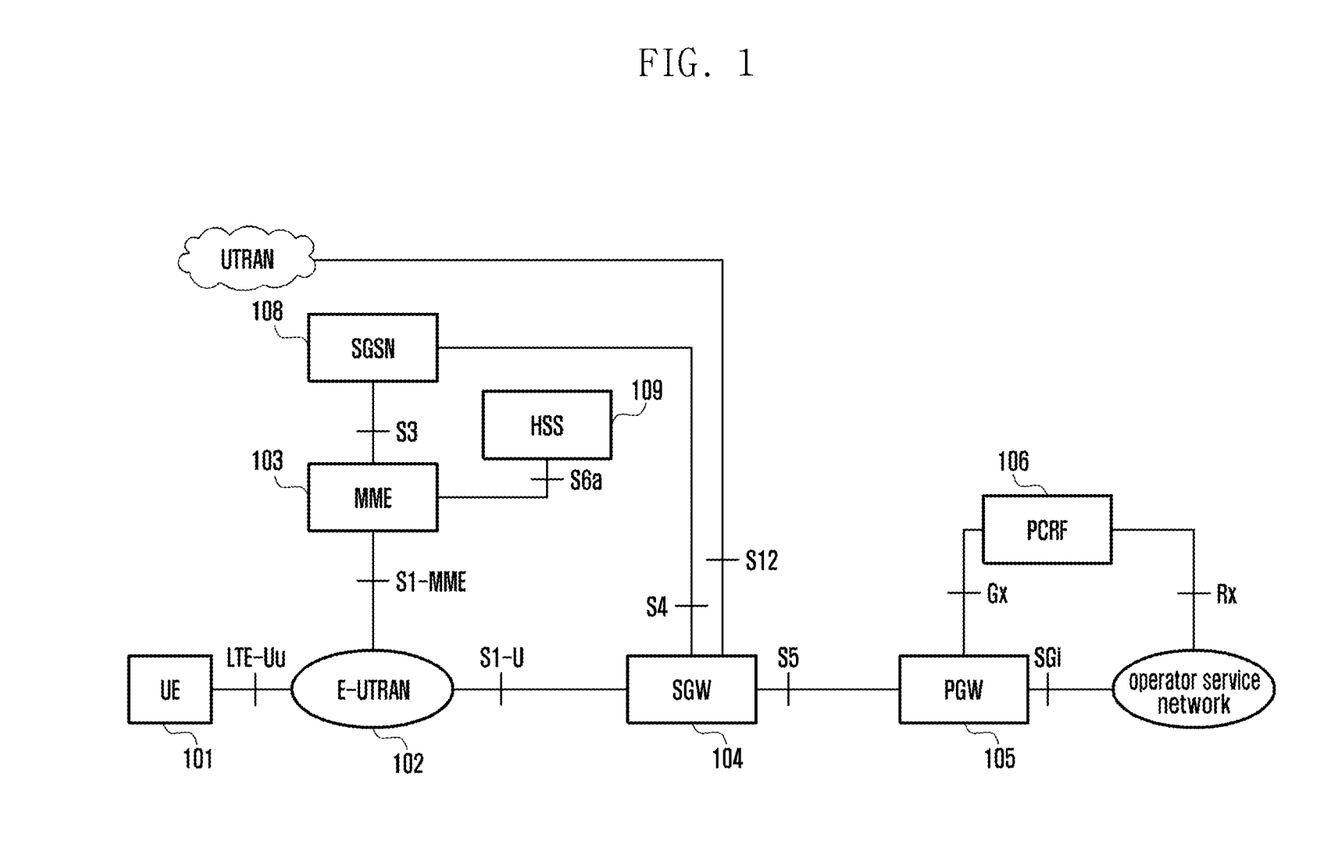
FIG. 1 is a schematic diagram illustrating a conventional LTE system.

Currently, mobile communication technologies tend to provide high-rate multimedia services increasingly. FIG. 1 is a schematic diagram illustrating a Long Term Evolution (LTE) system.

In FIG. 1, a User Equipment (UE) 101 is a terminal device for receiving data. An Evolved Universal Terrestrial Radio Access Network (E-UTRAN) 102 is a radio access network which includes an eNodeB/NodeB for providing a radio network interface for the UE. A Mobile Management Entity (MME) 103 is adapted to manage mobility contexts, session contexts and security information of the UE. A Serving Gateway (SGW) 104 is adapted to provide functions of a subscriber plane. The MME 103 and the SGW 104 may be in the same physical entity. A Packet Gateway (PGW) 105 is adapted to implement charging and legal monitoring functions. The PGW 105 and the SGW 104 may be in the same physical entity. A Policy and Charging Rules Function (PCRF) 106 is adapted to provide QoS policies and charging rules. A Service GPRS Supporting Node (SGSN) 108 is a network node device for providing routing for data transmission in a Universal Mobile Telecommunications System (UMTS). A Home Subscriber Server (HSS) 109 is a home sub-system of the UE and is adapted to protect UE information including the current location of the UE, the address of a serving node, UE security information and packet data contexts of the UE.

Group communication services are to provide a quick and effective mechanism to send same data to UEs in a group. The concept of the group communication is fully used in Land Mobile Radio (LMR) of a public security organization. One of the typical applications is a "Push to Talk (PTT)" function. When the group communication services are introduced to the LTE, the group communication service of the LTE needs to support at least the PTT voice communication which has similar performances as the PTT in the conventional group communication service. The group communication service of the SAE needs to support UEs of different states and different environments of the UEs. The LTE performs data transmission with broad bands, and thus the group communication service of the LTE needs to support data communications, such as voice communications and video communications.

In Group Call System Enabler (GCSE) of the LTE, functions of an application layer are introduced to 3GPP to support the group communication. UEs of the LTE are divided into different groups, and one UE may belong to one or multiple different GCSE groups. In the GCSE group, the UE needing to receive GCSE service data is called a receiving group member, and the UE sending the GCSE service data is called a sending group member. The group communication refers to the communication between the receiving group member and the sending group member. In addition, it is also needed to support communications between the UE and multiple groups at the same time. For example, the UE may perform communications of the voice service with one group and perform communications of the video service or other data service with another group.

Figure 2:
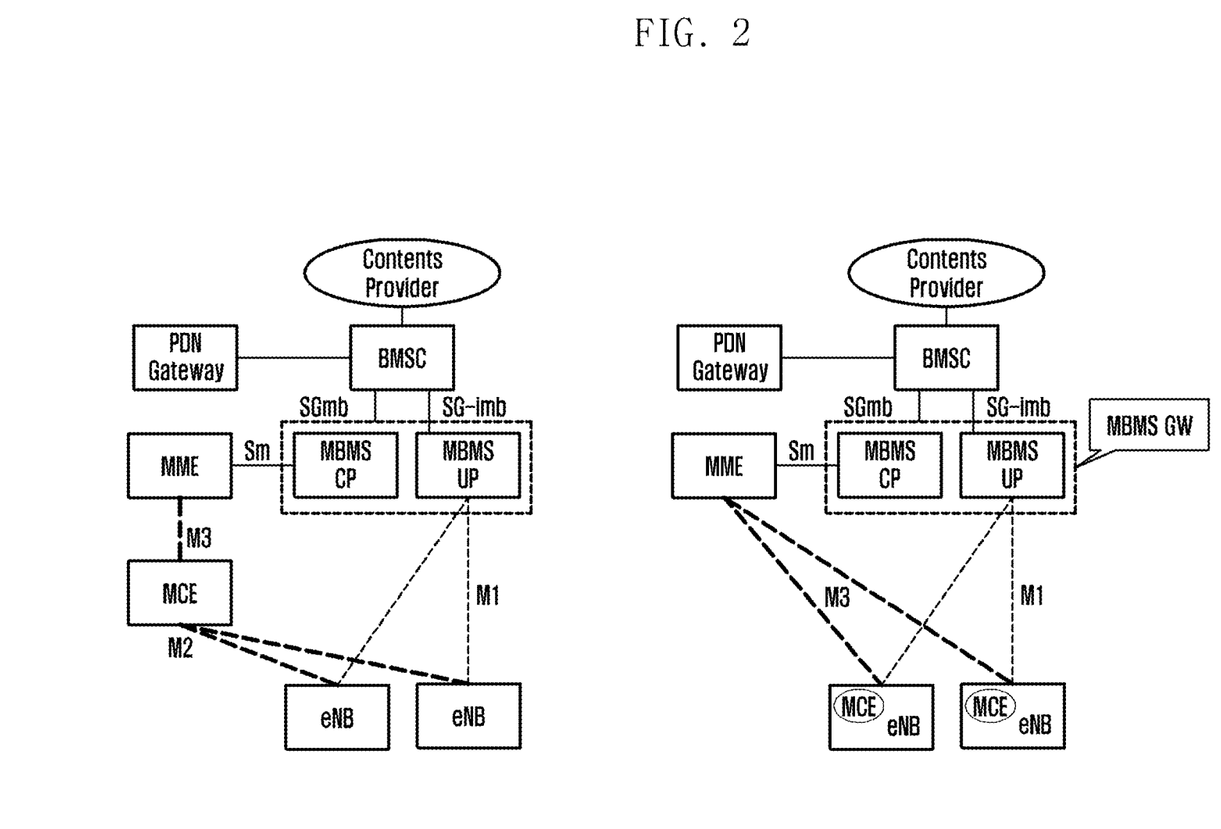
FIG. 2 is a schematic diagram illustrating a conventional eMBMS.

In order to fully utilize air interface resources, when multiple UEs need to receive data of the same service, a broadcast and multicast mode which is called Multimedia Broadcast and Multicast Service (MBMS) may be used. Each MBMS carrier provides services in a service area of the MBMS carrier. In each cell of the service area, a specific MCCH is used to transmit MBMS signaling. BM-SC is a center for providing the MBMS, and the MBMS data is sent from the BM-SC to an MBMS-GW. The MBMS-GW, which is a logic node or another network node, is located between the BM-SC and an eNB and is used to send/broadcast the MBMS data to each eNB needing to transmit data. The MBMS-GW sends a data packet to a corresponding eNB, and the eNB sends data to the UE. Control signaling is sent from the BM-SC to the MBMS-GW, and then is sent to the EUTRAN via a MME. The MCE, which is a node of the EUTRAN, is to receive the MBMS signaling, decide to use a MBSFN transmission mode and send signaling to the corresponding eNB. FIG. 2 shows a structure of an eMBMS. The MCE may be a separate node, or located together with the eNB. The MBMS of the LTE is called eMBMS for short.

The eMBMS may be transmitted in a single carrier cell, different cells use different carriers, and the UE at the edge of the cell may receive only the MBMS of the current cell. However, if adjacent cells transmit the same MBMS service by using the same carrier and transmit the MBMS in a synchronized way, the UE at the edge of the adjacent cell may receive a superposition of powers the two signals. Therefore, a continuous area is defined in conventional technologies. In the continuous area, each eNB uses the same carrier to synchronically transmit the same MBMS signal, so as to improve quality of receiving the MBMS by the UE. The continuous area is called a Single Frequency Network (SFN) area. The SFN area includes cells corresponding to continuous geography locations, and the cells use the same radio resources to synchronically transmit a certain MBMS.

The GCSE service may be transmitted via the eMBMS carrier of the LTE. However, the conventional eMBMS technologies can not satisfy the requirements of the GCSE services. For example, the GCSE service needs to establish a data carrier within 300 ms. But in the conventional eMBMS technologies, the MCE needs to firstly transmit the signaling to all eNBs in the MBSFN, and then the eNB synchronically transmits the MBMS control information via an air interface. The time period needed for this procedure is longer than the time requirements of the GCSE service. Currently, two methods are provided to solve the problem. In one method, the eMBMS carrier is established in advance. In the other method, a point-to-point carrier is established firstly in the network, data are sent to the receiving group member via the point-to-point carrier, at the same time, the network starts to establish the eMBMS carrier. After the eMBMS carrier is established successfully, the data are sent to the receiving group member via the eMBMS carrier. During a certain time period, the data are sent via both the point-to-point carrier and the eMBMS carrier.

Although the above methods solve the problem of the time delay when the carrier is established, the applicant of the present disclosure discovered that one problem is still to be solved. The current eMBMS system is used to send the MBMS only. After the service is started, the MCE may count the number of UEs and decide to suspend or restore data transmission according to the number of the UEs. Specifically, when the number of the UEs in an RRC connected mode is smaller than a threshold, the MCE decides to suspend the data transmission to save air interface resources and reduce power consumption of the UE. The MCE notifies the eNB to stop sending the control signaling of the eMBMS. In this way, the UE cannot receive the control signaling and the data of the eMBMS. When the eMBMS system is used to transmit the GCSE service, if the UE cannot receive the control signaling of the GSCE service and the UE still needs to receive the GCSE service, the UE has to establish the point-to-point channel for the GCSE service, and the UE cannot receive data in the procedure of establishing the point-to-point channel, thus data transmission is interrupted.

In order to solve the above technology problem, several methods are provided by the present disclosure to enhance the current procedure of obtaining a UE counting result, so that when the UE needs to receive the eMBMS, the MCE may obtain the correct counting result and not make wrong decision no matter whether the UE is in the RRC connected mode or in the idle mode. Therefore, it is unnecessary for the UE to establish the point-to-point channel, and interruption of the data transmission and unnecessary power consumption are avoided.

SUMMARY

The present disclosure provides a method, apparatus and system for supporting group service transmission and obtaining a UE counting result, so as to decrease data loss, reduce delay of establishing a data carrier and power consuming of the UE, and improve utilization of the air interface resources.

A method for obtaining a UE counting result includes:
  if a UE receives a UE counting message and a service corresponding to a service identifier comprised in the UE counting message is a GCSE service transmitted via a MBMS carrier,
  establishing, by the UE, a RRC connection; sending a UE counting response via the RRC connection;
  or, sending, by the UE, a RRC establishing message, and configuring a reason of establishing the RRC as MBMS UE counting.

Preferably, the UE is in an idle mode.

An apparatus includes: a receiving module, a sending module, a two-layer protocol module, and an application layer module; wherein
  the application layer module is to, when determining that a GCSE service is transmitted via a MBMS carrier, instruct the two-layer protocol module to response a UE counting message;
  the receiving module is to send a received UE counting message to the two-layer protocol module;
  the two-layer protocol module is to parse the UE counting message; generate a RRC establishing message according to the instruction of the application layer module, and generate a UE counting response after a RRC connection is established; or the two-layer protocol module is to parse the UE counting message; generate a RRC establishing message according to the instruction of the application layer module, and configure a reason of establishing the RRC as MBMS UE counting;
  the sending module is to send the message generated by the two-layer protocol module to an air interface.

An apparatus includes: a receiving module, a sending module, a two-layer protocol module, and an application layer module; wherein
  the receiving module is to send a received UE counting message to the two-layer protocol module;
  the two-layer protocol module is to parse the UE counting message; send a service identifier in the UE counting message to the application layer module;
  the application layer module is to, when determining a service corresponding to the service identifier is a GCSE service transmitted via a MBMS carrier, instruct the two-layer protocol module to response the UE counting message;
  the two-layer protocol module is further to generate a RRC establishing message according to the instruction of the application layer module, generate a UE counting response after a RRC connection is established; or the two-layer protocol module is further to generate a RRC establishing message according to the instruction of the application layer module; and configure a reason of establishing the RRC as MBMS UE counting;
  the sending module is to send the message generated by the two-layer protocol module to an air interface.

A method for obtaining a UE counting result, applied for supporting continuous transmission of a group service includes:
  receiving, by an eNB, a UE counting message comprising indication information indicating it is needed to count the number of UEs in an idle mode;
  sending, by the eNB, the UE counting message comprising the indication information;
  receiving, by the eNB, a counting response message;
  sending, by the eNB, the counting response message.

Preferably, a UE counting result of UEs in an RRC connected mode and UEs in an idle mode are obtained;
  the counting response messages received by the eNB are sent by the UEs in the RRC connected mode and the UEs in the idle mode.

Preferably, a UE counting result of UEs in an idle mode are obtained;
  the counting response messages received by the eNB are sent by the UEs in the idle mode.

Preferably, for the UE in the idle mode, receiving, by the eNB, the counting response message comprises:
  receiving a UE counting response via an established RRC connection;
  or, receiving a RRC establishing message, a reason of establishing the RRC in the RRC establishing message being MBMS UE counting.

A method for suspending data transmission, applied for supporting continuous transmission of a group service includes:
  receiving, by an eNB, a message, the message comprising a suspend indication and a service identifier; the suspend indication and the service identifier being used to indicate that data transmission of a service corresponding to the service identifier is to be suspended;

sending, by the eNB, the message comprising the suspend indication and the service identifier; initiating, by a UE needing to continuously receive service data corresponding to the service identifier, a procedure of establishing a point-to-point carrier;

stopping, by the eNB, sending the data service at a preset time point.

Preferably, the message further comprises time information indicating a modification period, a SFN or a time point from which the data transmission is suspended.

As can be seen from the above technical solutions, in the technical solutions for supporting group service transmission and obtaining a UE counting result provided by the present disclosure, the MCE notifies the eNB to obtain the UE counting result of the UEs in the idle mode, or the UEs in the idle mode sends the UE counting response, or when suspending the data transmission, the MCE notifies the eNB and the UE and the data are transmitted for a certain time period, during this time period, the point-to-point carrier may be established by the UE. According to the technical solutions of the present disclosure, when the UE needs to receive the eMBMS, the MCE may obtain the correct counting result and not make wrong decision no matter whether the UE is in the RRC connected mode or in the idle mode. Therefore, the UE does not need to establish the point-to-point channel, and the interruption of the data transmission and unnecessary power consumption are avoided.

DETAILED DESCRIPTION

In order to make the object, technical solution and merits of the present disclosure clearer, the present disclosure will be illustrated in detail hereinafter with reference to the accompanying drawings and specific examples.

The main idea of the present disclosure is as follows: When needing to obtain a UE counting result, an MCE decides whether to count the number of UEs in the idle mode according to the service type of a carried MBMS. If it is needed to count the number of UEs in the idle mode, the MCE obtains the UE counting result of both the UEs in the RRC connected mode and in the idle mode. Or, when it is decided to suspend the data transmission, the MCE notifies an eNB to delay the action of suspending the data transmission for a certain time period. During this time period, if the UE in the idle mode still needs to receive data transmitted via the original MBMS carrier, a point-to-point carrier may be established. After the point-to-point carrier is established, the eNB suspends transmission of the MBMS data and control information. According to the technical solutions of the present disclosure, data loss caused by changing of the data carriers is decreased, time delay for establishing the data carrier is reduced, the air interface resources is utilized effectively and power consuming of the UE is saved.

A first embodiment is provided.

In the first embodiment, a signaling flow for obtaining a UE counting result is described.

Figure 3:
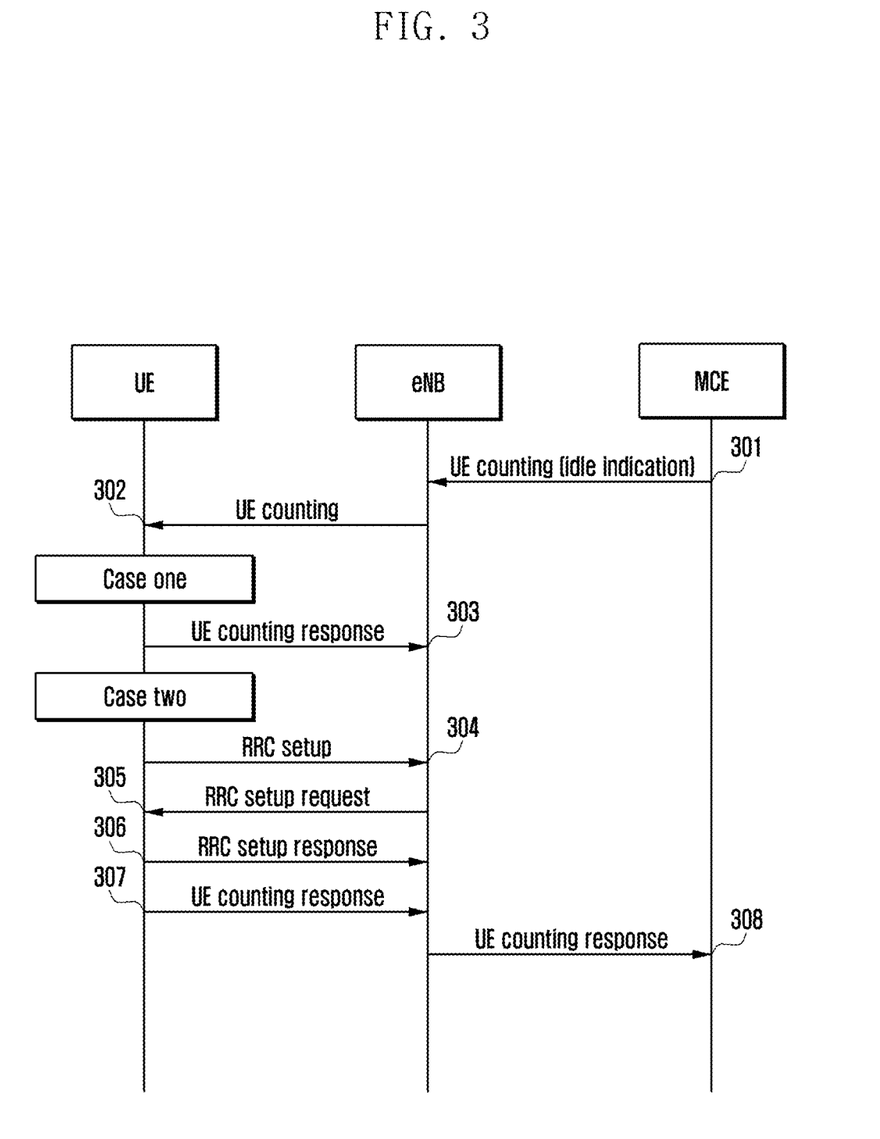
FIG. 3 is a flowchart illustrating signaling for obtaining a UE counting result according to a first embodiment of the present disclosure.

FIG. 3 is a flowchart illustrating signaling for obtaining a UE counting result according to a first embodiment of the present disclosure. As shown in FIG. 3, the signaling flow includes the following processing.

At 301, an MCE sends a UE counting request message to an eNB to notify the eNB to count the number of the UEs in a MBSFN scope. The message includes a MBSFN area identifier and a MBMS service identifier TMGI, and the message also includes indication information to indicate that the eNB needs to count the number of UEs in an idle mode.

When receiving MBMS data, the UE may be in a RRC connection mode or in the idle mode. The conventional method for UE counting may be used for the UEs in the RRC connected mode, but cannot be used for the UEs in the idle mode.

The MCE needs to determine whether need to count the UEs in idle mode. The MCE can determine it based on information carrying in an MBMS Session Start sent by an MME. For example, the MME sends the MBMS Session Start including the MBMS service identifier TMGI, and the message also indicates that a service carried by the MBMS carrier is a GCSE service.

Alternatively, according to operation maintenance pre-configuration, the MCE knows a certain MBMS service or some MBMS services are the GCSE service. For example, the MBMS service identifier TMGI corresponding to a group of CSGE services may be configured in advance, and the MCE may obtain the above information accordingly.

After determining the service needing to count the idle mode UEs, the MCE sends a counting request message including the indication information for the MBMS service needing to count the idle mode UEs.

At 302, the eNB sends a counting request message to the UE. The message is sent via a MBMS control channel of an air interface, and includes information indicating the MBMS service identifier. The UE may determine a MBMS service needing to obtain the number of the UEs according to the information included in the message. The message may also include indication information to indicate the UEs in the idle mode need to be counted. The UEs in the RRC connected mode and the UEs in the idle mode receive control information transmitted via the MBMS control channel. The following processing may be performed when the UE knows that the UE counting result needs to be obtained.

At 303, the UE sends a counting response to the eNB, which includes the following two cases.

In the first case, the UE is in the RRC connected mode. According to one embodiment, both the idle mode UEs and RRC connected mode UEs are counted. In this case, the UE in the RRC connected mode receives the message sent at 302, obtains the MBMS service identifier TMGI according to the information carrying in the message, and then knows the MBMS service needing the counting. If the UE is interested in the service and needs to receive the data sent via the MBMS, the UE sends the UE counting response to the eNB, so as to let the eNB count the UE number. If the message at 302 indicates that only the idle mode UEs are counted, the UE in the RRC connected mode does not make any response.

In the second case, the UE is in the idle mode. After receiving the message sent at 302, the UE obtains the MBMS service identifier TMGI according to the information carrying in the message, and then knows the MBMS service needing the counting result. If the UE is interested in the service and needs to receive the MBMS service, the UE needs to establish a RRC connection at first and send the UE counting response via the RRC connection, or the UE needs to adopt a new RRC establishing procedure and send the UE counting response to the eNB in the new RRC establishing procedure. The above two methods are described as follows.

In the first method, the UE initiates the RRC connection and sends the UE counting response via the RRC connection.

At 304, the UE sends a RRC setup message to the eNB. The message includes a UE identifier and a reason of establishing the RRC. The reason may be configured as a reason defined currently.

At 305, the eNB sends a RRC setup request message to the UE. The message includes configuration information for the UE.

At 306, the UE sends a RRC setup response message to the eNB.

At 307, the UE sends a UE counting response to the eNB. The message includes the information indicating the MBMS service identifier. After receiving the message, the eNB regards the UE as one of the UEs interested in the MBMS carrier service.

In the second method, the UE adopts the new RRC establishing procedure and sends the UE counting response to the eNB in the new RRC establishing procedure. The UE sends a RRC setup message to the eNB. The message includes a reason for establishing the RRC, and the reason is for UE counting. The message also includes information indicating the MBMS service, e.g., TMGI. After receiving the message, the eNB regards the UE as one of the UEs interested in the MBMS carrier service, and sends a RRC refusing message to the UE.

At 308, after the procedure of obtaining the counting result is finished, the eNB reports a counting result to the MCE via a message. The message includes a MBSFN area identifier, the MBMS service identifier TMGI and the number of the UEs. The number of the UEs may be the number of the UEs in the RRC connected mode, the number of the UEs in the idle mode, or the sum of the number of the UEs in the RRC connected mode and the number of the UEs in the idle mode.

Thus, the processing at the first embodiment is finished.

A second embodiment is provided.

The first embodiment describes the signaling flow for obtaining the UE counting result. Several different counting methods may be obtained by combining the first embodiment with existing counting methods. In one method, the RRC connected mode UEs are counted at first, if the number of the RRC connected mode UEs is smaller than a threshold, then in next step, the idle mode UEs are counted. The procedure is described in the second embodiments as follows.

Figure 4:
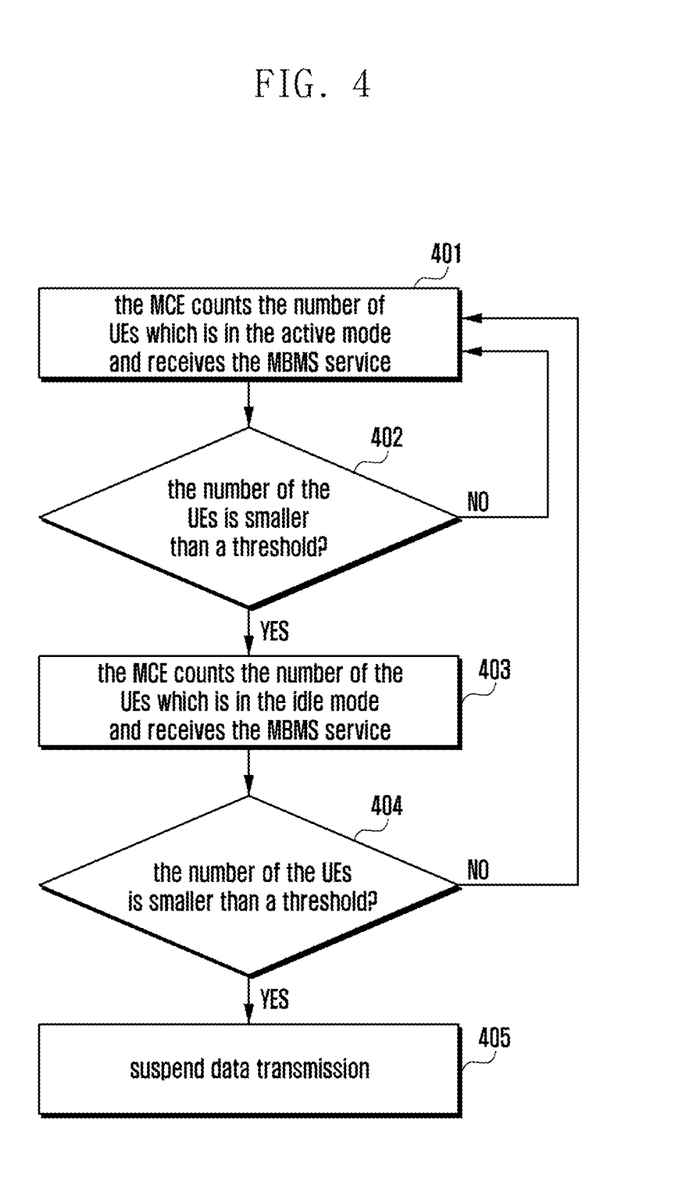
FIG. 4 is a flowchart illustrating a method for obtaining a UE counting result according to a second embodiment of the present disclosure.

At 401, the MCE counts the number of the RRC connected mode UEs who is interested in the MBMS service. The procedure of obtaining the UE counting result is the same as the existing counting method. Specifically, the MCE sends a UE counting request message to the eNB, the eNB sends a counting request message to the UE, the UE in the RRC connected mode sends a UE counting response to the eNB, and the eNB counts the RRC connected mode UEs in all cells that belongs to the request MBSFN area and sends the number of the UEs to the MCE.

At 402, it is determined whether the number of the UEs in the RRC connected mode is smaller than a preset threshold. If the number of the UEs in the RRC connected mode is not smaller than the preset threshold, the processing at 401 is performed later, and counter the RRC connected mode UEs again when necessary.

If the number of the UEs in the RRC connected mode is smaller than the preset threshold, processing at 403 is performed.

At 403, the MCE counts the number of the UEs which is in the idle mode and is interest in the MBMS service. In this step, the processing at the first embodiment may be performed. The MCE sends the UE counting request message to the eNB, and the message includes the indication information to indicate that the UEs in idle mode need to be counted. The eNB sends the UE counting request message to the UE, and the message includes the indication information to indicate that the UEs in idle mode need to be counted. Only the UEs in the idle mode send the UE counting response to the eNB. The eNB counts the UEs which is in the idle mode in all cells that belongs to the request MBSFN area and sends the number of the UEs to the MCE.

At 404, it is determined by the MCE whether the number of the UEs in the idle mode is smaller than a preset threshold. If the number of the UEs in the idle mode is not smaller than the preset threshold, the processing at 401 may be performed later, the number of the UEs in the RRC connected mode is counted again when necessary.

If the number of the UEs in the idle mode is smaller than the preset threshold, the processing at 405 is performed. The MCE decides to suspend the data transmission and sends new MBMS schedule information to the eNB via a message. The message includes a serial number of a modification period. When a modification period indicated by the serial number starts, the eNB sends the new schedule information to the UE. The new schedule information does not include the identifier of the MBMS service to be suspended. In a user plane, the eNB does not send the data of the MBMS service to be suspended. For the UE, neither the control information of the MBMS nor the user data of the MBMS is transmitted via the air interface.

The method described in the fourth embodiment may be used here. By using the enhanced procedure of suspending data transmission, the UE may continually receive the service originally transmitted via the MBMS.

Thus, the processing at the second embodiment is finished.

A third embodiment is provided.

Figure 5:
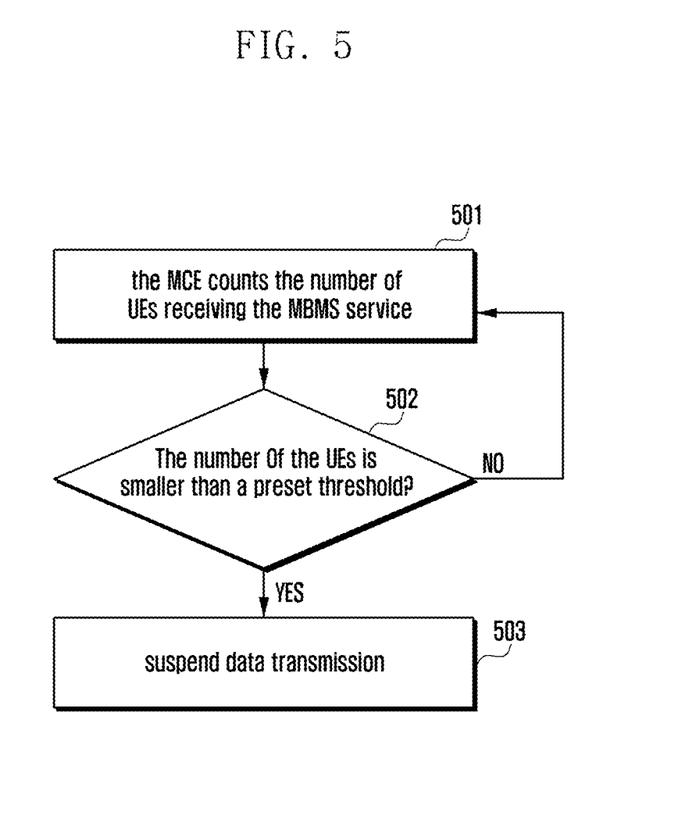
FIG. 5 is a flowchart illustrating a method for obtaining a UE counting result according to a third embodiment of the present disclosure.

In the method for obtaining the UE counting result provided by the second embodiment, the counting result of the UEs in the RRC connected mode are obtained firstly, and if the number of the UEs in the RRC connected mode is smaller than the preset threshold, the counting result of the UEs in the idle mode are obtained. By using this procedure, the influence for the UE is reduced but the time of obtaining the UE counting result is long. The third embodiment provides another method for obtaining the UE counting result as shown in FIG. 5.

At 501, the MCE counts the number of UEs receiving the MBMS service. The procedure is different from the existing procedure for obtaining the UE counting result in which only the UEs in the RRC connected mode are obtained. In this procedure at 501, the UE counting result of both the UEs in the RRC connected mode and in the idle mode are obtained. The MCE sends a UE counting request message to the eNB, and the message includes the indication information to indicate that the UEs in the idle mode needs to be counted. The eNB sends the UE counting request message to the UE, and the message includes the indication information to indicate that the UEs in the idle mode needs to be counted. The UEs in the idle mode and in the RRC connected mode send the UE counting response to the eNB. The eNB counts the number of the UEs which is in the idle mode and in the RRC connected mode in all cells belongs to the MBSFN area and sends the number of the UEs to the MCE.

At 502, it is determined by the MCE, whether the number of the UEs is smaller than a preset threshold. If the number of the UEs is not smaller than the preset threshold, the processing at 501 can be performed later, and the number of the UEs in the RRC connected mode and in the idle mode is counted again when necessary.

If the number of the UEs in the RRC connected mode and in the idle mode is smaller than the preset threshold, processing at 503 is performed.

At 503, the MCE decides to suspend the data transmission and sends new MBMS schedule information to the eNB via a message. The message includes a serial number of a modification period. When the modification period indicated by the serial number starts, the eNB sends the new schedule information to the UE. The new schedule information does not include the identifier of the MBMS service to be suspended. In a user plane, the eNB does not send the data of the MBMS service to be suspended. For the UE, neither the control information of the MBMS nor the UE data of the MBMS is transmitted via the air interface.

The method described in the fourth embodiment may be used here. By using the enhanced procedure of suspending data transmission, the UE may continually receive the service originally transmitted via the MBMS.

Thus, the processing at the third embodiment is finished.

A fourth embodiment is provided.

Figure 6:
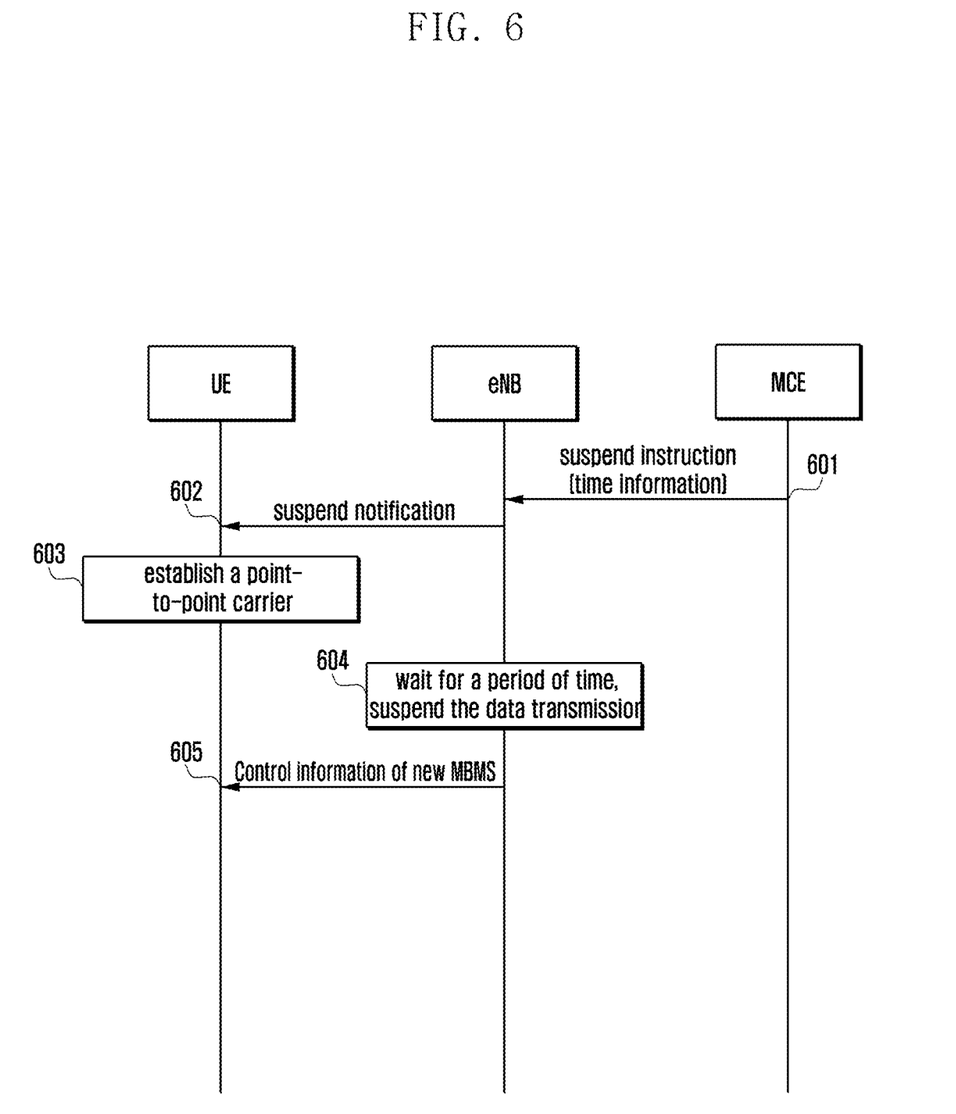
FIG. 6 is a flowchart illustrating a method for suspending data transmission according to a fourth embodiment of the present disclosure.

The second and third embodiments provide methods for obtaining the UE counting result which support continuously receiving the GCSE service by the UE. In the two methods, the procedure of obtaining the UE counting result is improved, so that the number of the UEs in the RRC connected mode and in the idle mode is count accurately in the procedure. If the existing procedure of obtaining the UE counting result rather than the above methods is used, only the number of the UEs in the RRC connected mode is counted. When the number of the UEs is smaller than a preset threshold, the MCE decides to suspend the data transmission. In this way, if the UE in the idle mode needs to go on receiving the GCSE service, the UE needs to initiate establishing of a point-to-point channel, and data cannot be received by the UE during the establishing procedure, and thus the continuity requirements of the GCSE service cannot be satisfied. In addition, the threshold for determining whether to suspend the data transmission is implementation related. If the threshold is larger than zero, when a few UEs want to receive the service and the number of the UEs is smaller than the threshold, the MCE still suspends the data transmission. Therefore, the above problem exists in the existing procedure for obtaining the UE counting result and the procedures for obtaining the UE counting result described in the second and the third embodiments. Methods provided by this embodiment are used to ensure the requirements of continuously receiving the GCSE service. The embodiment provides the method for continuously receiving service data when the MCE suspends the data transmission. As shown in FIG. 6, the method includes the following processing.

At 601, an MCE counts the number of UEs. If the number of the UEs is smaller than a threshold, the MCE initiates a suspend indication message to an eNB.

The processing for counting the number of the UEs may be performed by using the processing defined currently, or by using the methods described in the second or the third embodiments, or by using other processing for obtaining the counting result.

The suspend indication message may be implemented as follows.

In a first method, existing suspension procedure is used. For example, suspend indication information is carried in a MBMS scheduling information message. The MBMS scheduling information message defined currently includes configuration of a MBMS control channel and contents transmitted via the control channel, and also includes MCCH update time. The MCCH update time indicates a modification period when new control information starts to be used. According to the present disclosure, new indication information is included. The new indication information indicates a MBMS service of which the data transmission is to be suspended. Therefore, the new indication information includes both an identity of a MBMS service and an indication of that transmission of service data is to be suspended. Preferably, time information may be included to indicate the modification period from which the data transmission is suspended. The MCCH update time in the message defined currently may be used to indicate the time point from which the data transmission is suspended.

In a second method, a new message is used. The MCE sends the new message, e.g., a suspend indication message to the eNB. The new message includes an identifier of a MBMS service of which the data transmission is to be suspended, and may further include time information for indicating a modification period from which the data transmission is suspended.

After receiving the message sent at 601, the eNB may send a response message to the MCE for acknowledge the receipt of the message sent at 601.

At 602, the eNB sends a suspend notification message via an air interface. The suspend message includes information for indicating the identifier of MBMS service and may include the time information for indicating the modification period from which the data transmission is suspended. Or, the time information may indicate other time mode, e.g., indicate a SFN from which the data transmission is suspended, or indicate a certain time period after which the data transmission is suspended, the certain time period may be several milliseconds or several SFNs. Or the suspend notification message may not include the time information but include the identifier of the MBMS service. After receiving the suspend notification message by the UE, if the UE needs to receive the service, processing at 603 is performed.

At 603, the UE needing to receive the service data initiates a procedure of establishing a point-to-point carrier which is the same as the conventional procedure of establishing the point-to-point carrier and is not described herein.

At 604, the eNB waits for a period of time which is determined according to the time indicated by the message sent at 601. When the indicated time arrives, the eNB starts to suspend the data transmission of the MBMS service, does not send the control information of suspend MBMS service via the air interface, and starts to send new control information, that is, the processing at 605 is performed. The new control information does not include the information of the service the data transmission of which is to be suspended.

Afterwards, the MCE may initiate a procedure for obtaining the UE counting result again. When UE data can be sent via the MBMS carrier, the UE receives the control information of the MBMS. The control information includes the identifier of the MBMS service. Here, the UE initiates a release of the point-to-point carrier and starts to receive the GCSE service via the MBMS carrier.

Thus, the processing at the fourth embodiment is finished.

Figure 7:
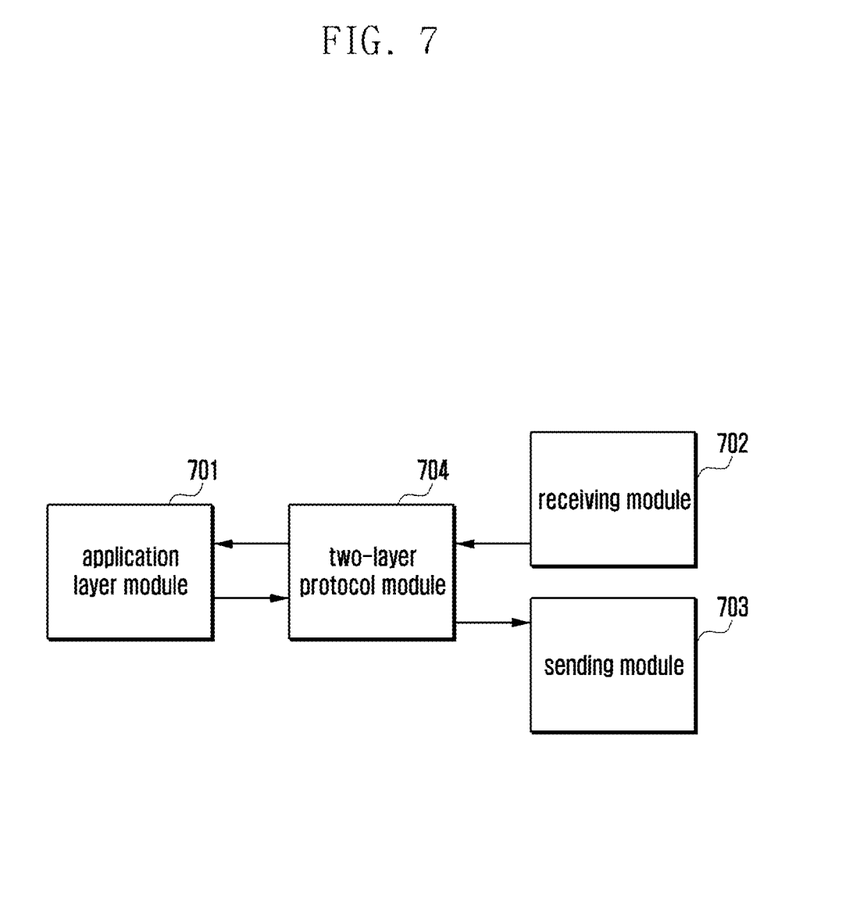
FIG. 7 is a schematic diagram illustrating a UE according to a fifth embodiment of the present disclosure.

FIG. 5 is a flowchart illustrating a method for obtaining a UE counting result by a UE. In the above embodiments, protocols are changed to obtain the UE counting result. According to the present disclosure, the UE may be changed rather than modification the air interface protocols, and the UE in the idle mode sends the UE counting response. As shown in FIG. 7, the UE includes an application layer module 701, a two-layer protocol module 704, a receiving module 702 and a sending module (transmitting module) 703.

The receiving module 702 is to receive a message from an air interface and send the message to the two-layer protocol module 704.

The two-layer protocol module 704 relates to RRC, PDCP, RLC and MAC protocols. The two-layer protocol module 704 is to parse the message received from the air interface. If the message is a UE counting message of a MBMS service, the two-layer protocol module 704 is to send a message to the application layer module 701. The application layer module 701 determines that a service carried by the MBMS is a GCSE service, and sends a message to the two-layer protocol module 704 to indicate that a RRC connection needs to be established to response the UE counting message. The two-layer protocol module 704 generates messages of the air interface, the messages include messages for establishing the RRC and a UE counting response message. The two-layer protocol module 704 sends the messages to an eNB via the sending module 703.

Alternatively, the application layer module 701 determines that the GCSE service is transmitted via the MBMS carrier, and sends a message to the two-layer protocol module 704 to instruct the two-layer protocol module 704 that a RRC connection needs to be established when the UE counting message is received so as to response the UE counting message. For example, the application layer module 701 sends the two-layer protocol module 704 a message including an instruction of that the UE needs to response the MBMS UE counting and including an MBMS carrier identifier TMGI. The UE stores the information. After receiving the message from the air interface, the receiving module 702 sends the message to the two-layer protocol module 704. The two-layer protocol module 704 relates to the RRC, PDCP, RLC and MAC protocols. If the UE is in the RRC connected mode, a RRC layer of the UE sends a UE counting response according to the current protocol. If the UE is in the RRC idle mode, the two-layer protocol module 704 parses the message received from the air interface. If the message is the UE counting message of the MBMS service, according to the above stored information, if it is determined that the MBMS needs the corresponding MBMS service, the two-layer protocol module 704 initiates a procedure of establishing a RRC connection, generates messages of the air interface including messages for establishing the RRC. After the RRC connection is established, the two-layer protocol module 704 generates a UE counting response message, and sends the messages to the eNB via the sending module 703.

Thus, the processing at the fifth embodiment is finished.

It should be understood that the above are only preferred embodiments of the present disclosure and are not for use in limiting the protection scope of the present disclosure. Any modification, equivalent replacement and improvement made within the scope of the present disclosure should be covered under the protection scope of the present disclosure.

What is claimed is:

1. A method performed by a base station in a wireless communication system, the method comprising:
   receiving, by the base station from a multi-cell/multicast coordination entity (MCE), a first counting request message for requesting a number of terminals, in an idle mode, interested in a service, wherein the first counting request message comprises an area identifier and an identity of the service;
   transmitting, by the base station to at least one terminal in a cell belonging to an area identified by the area identifier, a second counting request message comprising the identity of the service;
   receiving, by the base station from at least one terminal interested in the service identified by the identity of the service, a first counting response message comprising information indicating that the at least one terminal is interested in the service, wherein the at least one terminal interested in the service is in the idle mode;
   transmitting, by the base station to the MCE, a second counting response message including a number of terminals, in the idle mode, interested in the service;
   receiving, by the base station from the MCE, a first message, in case that the number of terminals, in the idle mode, interested in the service is smaller than a predetermined value, wherein the first message comprises first information and a system frame number (SFN) and wherein the first information comprises the identity of the service in which data transmission is to be suspended and the SFN indicates a radio frame from which the data transmission for the service is to be suspended;
   transmitting, by the base station to the MCE, a response message for acknowledging receipt of the first message;
   transmitting, by the base station to a terminal, a second message comprising second information related to the service and an indication indicating that the data transmission of the service is to be suspended, except the SFN;
   transmitting, by the base station, a data for the service before the radio frame indicated by the SFN; and
   suspending, by the base station, the transmitting of the data for the service from the radio frame indicated by the SFN.

2. The method of claim 1, wherein the first message comprises a multimedia broadcast and multicast service (MBMS) scheduling information message.

3. The method of claim 1, wherein the first information comprises temporary mobile group identity (TMGI).

4. A base station in a wireless communication system, the base station comprising:
   a transceiver; and
   a controller coupled with the transceiver and configured to:
      receive, from a multi-cell/multicast coordination entity (MCE), a first counting request message for requesting a number of terminals, in an idle mode, interested in a service, wherein the first counting request message comprises an area identifier and an identity of the service, transmit, to at least one terminal in a cell belonging to an area identified by the area identifier, a second counting request message comprising the identity of the service, receive, from at least one terminal interested in the service identified by the identity of the service, a first counting response message comprising information indicating that the at least one terminal is interested in the service, wherein the at least one terminal interested in the service is in the idle mode, transmit, to the MCE, a second counting response message including a number of terminals, in the idle mode, interested in the service, receive, from the MCE, a first message, in case that the number of terminals, in the idle mode, interested in the service is smaller than a predetermined value, wherein the first message comprises first information and a system frame number (SFN) and wherein the first information comprises the identity of the service in which data transmission is to be suspended and the SFN indicates a radio frame from which the data transmission for the service is to be suspended, transmit, to the MCE, a response message for acknowledging receipt of the first message, transmit, to a terminal, a second message comprising second information related to the service and an indication indicating that the data transmission of the service is to be suspended, except the SFN, transmit a data for the service before the radio frame indicated by the SFN, and suspend transmitting of the data for the service from the radio frame indicated by the SFN.

5. The base station of claim 4, wherein the first message comprises a multimedia broadcast and multicast service (MBMS) scheduling information message.

6. The base station of claim 4, wherein the first information comprises temporary mobile group identity (TMGI).

* * * * *